Nov. 21, 1950  L. E. MOBERLY  2,530,984

PROCESS FOR IMPREGNATING CARBON BRUSHES

Filed Sept. 29, 1949

WITNESSES:

INVENTOR
Lawrence E. Moberly.
BY
ATTORNEY

Patented Nov. 21, 1950

2,530,984

UNITED STATES PATENT OFFICE 2,530,984

PROCESS FOR IMPREGNATING CARBON BRUSHES

Lawrence E. Moberly, Pittsburgh, Pa., assignor to Westinghouse Electric Corporation, East Pittsburgh, Pa., a corporation of Pennsylvania Application September 29, 1949, Serial No. 118,524

4 Claims. (Cl. 117—121)

This invention relates to a method for treating carbon bodies or brushes to impregnate them with metal halides.

This application is a continuation-in-part of application Serial No. 650,085, filed in the name of Lawrence E. Moberly, February 25, 1946, now Patent No. 2,512,362.

Heretofore, the chemical processes practiced for impregnating carbon bodies and carbon brushes with metal halides have resulted in the forming of deleterious materials in the brushes in addition to the impregnants. Such materials are undesirable and must be removed for good brush operation. The processes for removing such additional materials generally either decompose or remove the impregnants or change the characteristics of the brush so that it will not meet specifications. Consequently, in order to impregnate brushes by chemical methods, it is necessary to employ impregnants that will not produce materials hard to remove or which are objectionable in use.

The object of the invention is to provide for impregnating carbon brushes with metal halides having high melting temperatures and low solubility characteristics.

Other objects of the invention will, in part, be obvious and, in part, will appear hereinafter.

Figure 1:
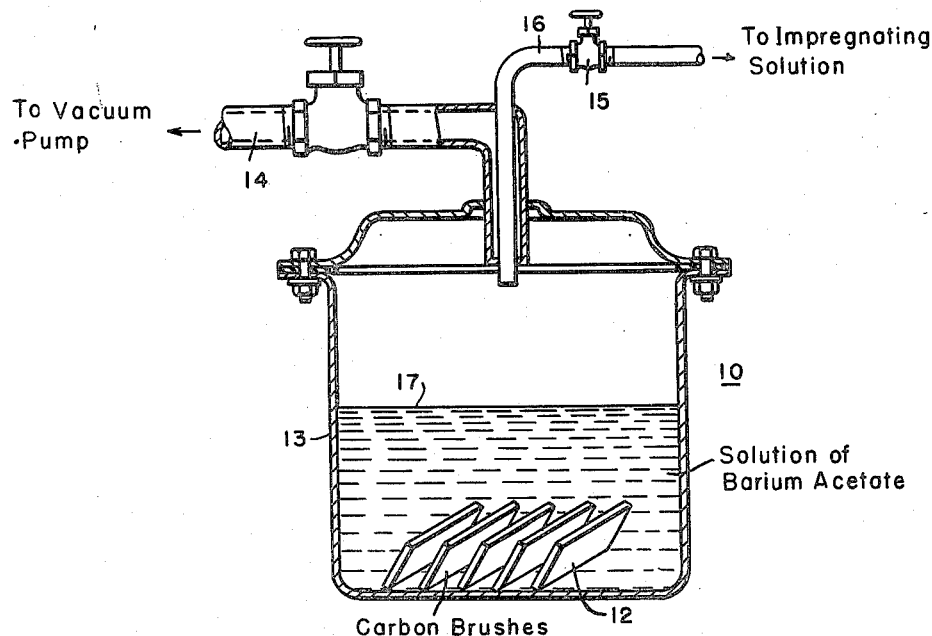
Figure 2:
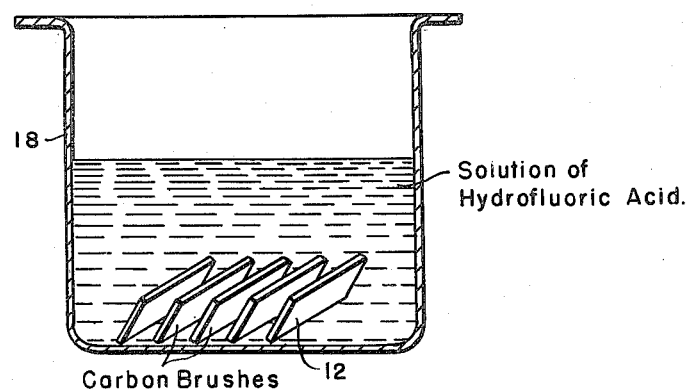

For a general understanding of the nature and objects of the invention, reference should be had to the following detailed description, taken in conjunction with the accompanying drawing, in which:

Figure 1 is a diagrammatic view of vacuum apparatus adapted for the vacuum impregnation of carbon bodies or brushes; and Fig. 2 is a diagrammatic view of a container showing how the carbon bodies or brushes may be soaked in a halogen acid to produce the impregnants in the brushes.

It has been found that the impregnation of carbon brushes, for use on commutators, with a metal halide gives very beneficial results. It has been established that brushes treated with metal halides apply lubricating films to the commutator which greatly increase the life of the brushes. Many explanations have been offered as to why this happens, but it is sufficient for the purpose of this application to say that trials have demonstrated the fact.

The use of metal halides in brushes was originally intended for brushes used in high altitudes to prevent dusting. However, it was soon found that metal halides were beneficial when embodied in brushes utilized on dynamoelectric machines operated on the earth's surface.

In the present invention, the problem of introducing metal halides which have high melting temperatures and low solubility characteristics has been solved. Brushes which operate at high temperatures and which are unaffected by solvents of one kind or another, such as water, are highly desirable. It has also been found that the materials employed for impregnating the brushes should be substantially non-hygroscopic so that they do not absorb moisture from the atmosphere.

Referring now to the drawing, and Fig. 1 in particular, a vacuum tank shown generally at 10 is provided for impregnating the brushes. As illustrated, a number of carbon bodies or brushes 12 are introduced into the container 13. The vacuum pump is then set in operation to evacuate the container 13 through the tube 14. This effects the removal of substantially all the air from the porous brushes 12.

After the container 13 has been evacuated, the valve 15 in the pipe 16 is opened and a quantity of impregnating solution, which in this instance is a solution of barium acetate, is delivered to the container 13. The solution 17 in the tank 13 will be raised to a level high enough to immerse all of the brushes 12. Since the carbon brushes 12 have been subjected to a vacuum, most of the air has been removed and the solution of barium acetate will rapidly penetrate the brushes and produce a substantially homogeneous impregnation.

After the brushes 12 have been impregnated, they may be subjected to a heat treatment either in the vacuum container 13, or they may be removed from the vacuum container and buried in a mass of powdered carbon. The purpose of either heating in a vacuum or buried in powdered carbon is to keep them out of contact with the air. It will be readily understood that the brushes may be protected from the atmosphere in other ways well known in the art. Further the heat treatment may be dispensed with and satisfactory impregnation effected by immersing the brushes carrying the materials deposited during soaking in the solution of barium acetate in the hydrofluoric acid.

Means for heating the brushes either in the vacuum container 13 or buried in powdered carbon are not illustrated since means for applying heat under such conditions are well known in the art. Electrical heating apparatus could readily be employed. It has been found that the heating of the brushes to a temperature of around 500° C. is adequate to effect the decomposition of the barium acetate solution.

When the barium acetate solution in the brush is subjected to a temperature of the order of 500° C., it breaks down into barium oxide and barium carbonate. The brushes carrying a quantity of barium oxide and barium carbonate will then be removed from the vacuum tank or the mass of powdered carbon in which they have been buried and introduced into a container such as 18. A sufficient quantity of a solution of hydrofluoric acid is introduced into the container 18 to immerse the brushes.

The concentration of hydrofluoric acid will depend on the amount of metal halide it is desired to form or precipitate in the brushes. It has been found that by using concentrated solutions of barium acetate and hydrofluoric acid that 8% by weight of a metal halide can be deposited or formed in the carbon brush by a single impregnation. In the manufacture of brushes, it has been found that when they carry 8% metal halide that they have satisfactory wearing characteristics for most purposes.

When the brushes carrying the residue of a heat treated solution of barium acetate is immersed in the hydrofluoric acid, a chemical action results and barium fluoride is precipitated out of or formed in the brush, and carbon dioxide and water are released. The carbon dioxide being a gas will escape. After the formation of the barium fluoride, the brushes are subjected to a drying treatment at around 100° C. which drives off excess hydrofluoric acid and the water formed.

If a sufficient amount of barium fluoride has not been deposited with one treatment, it can be repeated until a sufficient amount of barium fluoride is deposited. It is well known that barium fluoride has a high melting temperature, low solubility characteristics and is substantially non-hygroscopic.

It has been found that if instead of using a solution of hydrofluoric acid, hydroiodic acid is substituted, then barium iodide is produced in the brushes.

While the use of solutions of halogen acids have been specifically described, halogen acid gases or halogen gases may also be employed.

Brushes impregnated with barium fluoride have been tested to determine their utility. Brushes carrying barium fluoride have proved very successful in resisting dusting at high altitudes. These brushes also have withstood wear and dusting under other conditions.

Since various changes may be made in the hereinbefore described methods and different embodiments of the invention may be made without departing from the scope and spirit thereof, it is intended that all matter contained in the above description or shown in the accompanying drawing shall be interpreted as illustrative and not in a limiting sense.

I claim in my invention:

1. In the process of treating carbon brushes, the steps of impregnating the carbon brush with substantial amounts of a concentrated solution of barium acetate, heating the carbon brush and contained solution to a temperature of the order of 500° C. for a period of time sufficient to decompose substantially completely the barium acetate and thereby deposit solid barium oxide and barium carbonate within the pores of the carbon brush and drive off volatile components, and subjecting the brush and the barium oxide and barium carbonate contained therein to a halogen acid selected from the group consisting of hydrofluoric acid and hydroiodic acid for a period of time sufficient to substantially completely change the deposited barium oxide and barium carbonate to a halogenated barium compound.

2. In the process of treating carbon brushes to embody therein a metal halide, the steps of impregnating the carbon brush with substantial amounts of a concentrated solution of barium acetate, heating the carbon brush while out of contact with the air to a temperature of the order of 500° C. for a period of time sufficient to decompose substantially completely the barium acetate and thereby deposit solid barium oxide and barium carbonate within the pores of the carbon brush and drive off the volatile components, and subjecting the brush and the barium oxide and barium carbonate contained therein to a halogen acid selected from the group consisting of hydrofluoric acid and hydroiodic acid for a period of time sufficient to substantially completely change the barium oxide and barium carbonate to a halogenated barium compound.

3. In the process of treating carbon brushes, the steps of impregnating the carbon brush with the concentrated solution of barium acetate, heating the carbon brush and contained barium acetate out of contact with the air to decompose substantially completely the barium acetate and thereby deposit solid barium oxide and barium carbonate in the pores of the carbon brush and drive off the volatile components and subjecting the carbon brush and the residue of the barium acetate carried by it with hydrofluoric acid for a period of time sufficient to substantially completly convert the barium oxide and barium carbonate to barium fluoride in the brush, the solution for impregnating the carbon brush and the acid for soaking the brush being of predetermined concentrations capable of depositing 8% by weight of barium fluoride in the carbon brush.

4. In the process of treating carbon brushes, the steps of vacuum treating a carbon brush, impregnating the vacuum treated brush with a concentrated solution of barium acetate, subjecting the brush and the contained barium acetate to a temperature of about 500° C. for a period of time sufficient to break down the barium acetate and treating the solid components of the barium acetate deposited in the brush with a halogen acid selected from the group consisting of hydrofluoric acid and hydroiodic acid to form a metal halide in the carbon brush capable of producing a lubricating film when the brush rides on a copper surface.

LAWRENCE E. MOBERLY.

No references cited.